(12) United States Patent
Khidekel et al.

(10) Patent No.: US 11,436,634 B2
(45) Date of Patent: Sep. 6, 2022

(54) ADAPTIVE OPTIMIZATION OF A CONTENT ITEM USING CONTINUOUSLY TRAINED MACHINE LEARNING MODELS

(71) Applicant: Adxcel Inc., Pleasanton, CA (US)

(72) Inventors: Yuri Khidekel, Lafayette, CA (US); Mikhail Zaleshin, Veliky Novgorod (RU); Vladimir Bashmakov, Moscow (RU)

(73) Assignee: Adxcel Inc., Pleasanton, CA (US)

( * ) Notice: Subject to any disclaimer, the term of this patent is extended or adjusted under 35 U.S.C. 154(b) by 104 days.

(21) Appl. No.: 16/831,627

(22) Filed: Mar. 26, 2020

(65) Prior Publication Data
US 2021/0209641 A1 Jul. 8, 2021

Related U.S. Application Data

(60) Provisional application No. 62/956,935, filed on Jan. 3, 2020.

(51) Int. Cl.
*G06Q 30/02* (2012.01)
*G06N 20/20* (2019.01)

(52) U.S. Cl.
CPC ......... *G06Q 30/0254* (2013.01); *G06N 20/20* (2019.01)

(58) Field of Classification Search
None
See application file for complete search history.

(56) References Cited

U.S. PATENT DOCUMENTS

| 2013/0236002 | A1 | 9/2013 | Jennings et al. | |
| 2014/0046777 | A1 | 2/2014 | Markey et al. | |
| 2016/0162931 | A1 | 6/2016 | Harik et al. | |
| 2016/0335659 | A1* | 11/2016 | Lewis | G06Q 30/0244 |
| 2018/0060744 | A1* | 3/2018 | Achin | G06N 5/02 |
| 2019/0102574 | A1* | 4/2019 | Roberts | G06F 16/221 |

OTHER PUBLICATIONS

Bradley, "The Use of the Area under the ROC Curve in the Evaluation of Machine Learning Algorithms", Pattern Recognition, vol. 30, No. 7, pp. 1145-1159, 1997 (Year: 1997).*

* cited by examiner

*Primary Examiner* — Christopher B Tokarczyk
(74) *Attorney, Agent, or Firm* — Lowenstein Sandler LLP

(57) ABSTRACT

A processor receives requests for content items and identifies a first subset of machine learning (ML) models that satisfy a reliability criterion and a second subset of ML models that fail to satisfy the reliability criterion, wherein each ML model is associated with a respective content template and is trained to output a probability that a target associated with an input set of characteristics would perform a target action responsive to being presented with a content item generated based on the respective associated content template. For each request in a first group, the processor inputs the respective set of characteristics associated with the request into each ML model of the first subset, selects a content template, and generates a content item based on the selected content template. For each request in the second group, the processor generates a content item based on a content template associated with the second subset.

20 Claims, 8 Drawing Sheets

ADAPTIVE OPTIMIZATION OF A CONTENT ITEM USING CONTINUOUSLY TRAINED MACHINE LEARNING MODELS

RELATED APPLICATIONS

This patent application claims the benefit under 35 U.S.C. § 119(e) of U.S. Provisional Application No. 62/956,935, filed Jan. 3, 2020.

TECHNICAL FIELD

Embodiments of the present disclosure relate, in general, to optimizing content, and in particular to optimizing content of web components using machine learning.

BACKGROUND

Web contents can contain various components, such as a text, an audio, a video, and an image. Such components can be combined in many different ways. Systems that generate web content from these numerous combinations may suffer from an effect of combinatorial explosion. Combinatorial explosion describes the effect of functions that grow rapidly (e.g., exponentially) as a result of combinatorial considerations. Combinatorial explosion can pose a problem in computing, as there may be insufficient resources (e.g., insufficient memory, processing power, time, etc.) to test every possible unique combination of component values and determine an optimal combination of component values based on the testing.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Embodiments are directed to methods and systems for using machine learning models to generate web content having an optimal combination of content components within a reduced amount of time by using minimal resources. A web content can correspond to any form of information provided via a web page. Within a web content, there may be different types of audiovisual components (e.g., a title, a call to action, an image, a video, an audio, a background image, a message, etc.) laid out in various ways on a web page. The optimal combination of these components for web content may achieve a defined result (e.g., a response action from a target audience of the content that can be measured by a key performance indicator (KPI)). However, to identify the optimal combination, millions to billions of different possible combinations of content components should be tested for thousands to millions of different target audiences. Individual testing of each combination for each target audience would take enormous processing resources and time. Embodiments described herein provide an adaptive optimization technique for a web content by initially using random combinations of content, and using machine learning models that detected strong data patterns in key performance indicators associated with the combinations of content and at the same time gradually training other premature machine learning models for which data patterns have not yet emerged. Embodiments save the processing time and resources in the generation and application of machine learning models that can determine content combinations to output based on target audiences.

Embodiments are discussed with reference to generating and delivering web content. However, it should be understood that the embodiments discussed herein also apply to other systems in which there are many different combinations of components that are possible for a large variety of targets. For example, embodiments may determine email content to deliver to a target, a text message (e.g., an MMS message) to deliver to a target, a physical mailer to send to a target, a video to output to a television of a target, and so on. Accordingly, it should be understood that discussions associated with web content herein also apply to many other different scenarios, such as email content, message content, mailer content, video content, and so on.

Figure 1:
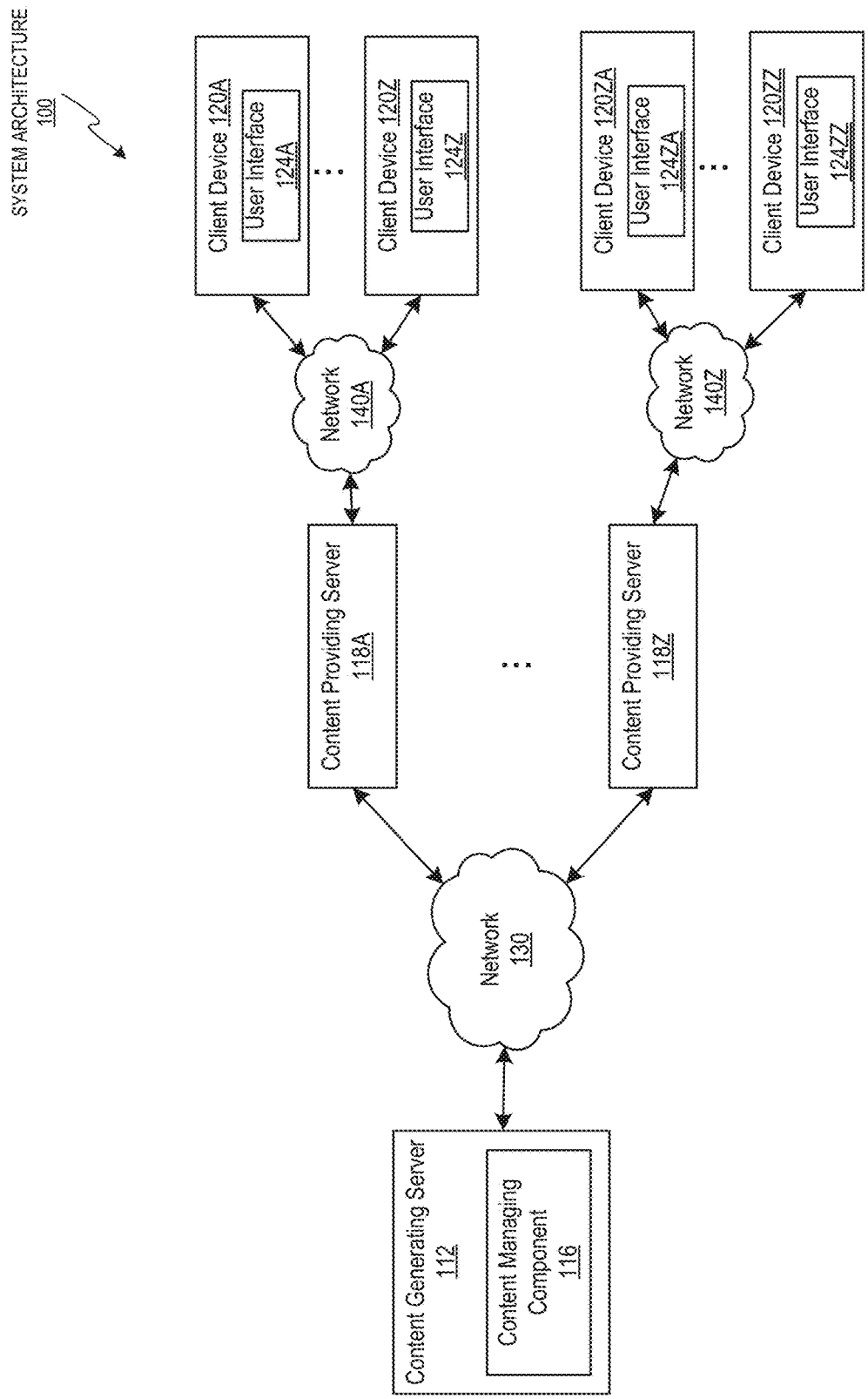
FIG. 1 illustrates an example of a system architecture for implementations of the present disclosure.

FIG. 1 illustrates an example of a system architecture 100 for implementations of the present disclosure. The system architecture 100 includes a content generating server 112 and content providing servers 118A-118Z connected via a network 130. Moreover, the system architecture 100 includes client devices 120A-120Z, 120ZA-120ZZ connected to the content providing servers 118A-118Z connected via networks 140A-140Z.

The network 130 and the networks 140A-140Z may be public networks (e.g., the Internet), private networks (e.g., a local area network (LAN) or wide area network (WAN)), or a combination thereof. The network 130 and/or the networks 140A-140Z may include a wireless infrastructure, which may be provided by one or more wireless communications systems, such as Wi-Fi hotspot connected with the network 130 and/or the networks 140A-140Z and/or a wireless carrier system that can be implemented using various data processing equipment, communication towers, etc. Additionally or alternatively, the network 130 and/or the networks 140A-140Z may include a wired infrastructure (e.g., Ethernet). In some embodiments, the network 130 and the networks 140A-140Z can be a single network. In some other embodiments, the networks 140A-140Z can form a single network.

The content generating server 112 may be represented by one or more physical machines (e.g., server machines, desktop computers, etc.) that include one or more processing devices communicatively coupled to memory devices and input/output (I/O) devices. The content generating server 112 may receive requests for content items from the content providing servers 118A-118Z. A content item can correspond to an item visually or aurally presented on a web page supported by the content providing servers 118A-118Z. Examples of a content item can include a personalized advertisement, media (a video or music) or consumer electronics recommendation, a landing page, a check out page, a packaging or a cover design, an email or a text message content, message of a physical mail, a video for a television, and so on The content generating server 112 may process the received requests and generate content items for the requests, as will be described below with respect to FIGS. 4, 5A, and 5B. In one embodiment, the content generating server 112 may provide the generated content items to the content providing servers 118A-118Z for presentation to the client devices 120A-120Z, 120ZA-120ZZ.

The content providing servers 118A-118Z may be represented by one or more physical machines (e.g., server machines, desktop computers, etc.) that include one or more processing devices communicatively coupled to memory devices and input/output (I/O) devices. The content providing servers 118A-118Z may provide a web page or any other medium that contains various contents (e.g., a personalized advertisement, media (a video or music) or consumer electronics recommendation, a landing page, a check out page, a packaging or a cover design, an email or a text message content, message of a physical mail, a video for a television) to the client devices 120A-120Z, 120ZA-120ZZ. The content providing servers 118A-118Z may also gather characteristics about target audiences of the client devices 120A-120Z, 120ZA-120ZZ. Such characteristics can include demographic information (such as, an age or a gender), contextual information (such as, a brand of the client devices 120A-120Z, 120ZA-120ZZ, an operating system of the client devices 120A-120Z, 120ZA-120ZZ, a time zone, a geographic location), historical (or user behavioral) features (such as, a number of impressions, time since the last impression, a number of clicks).

The content providing servers 118A-118Z may receive requests for web contents from the client devices 120A-120Z, 120ZA-120ZZ. In response, the content providing servers 118A-118Z may send requests for content to the content generating server 112. Alternatively, or additionally, the content providing servers 118A-118Z may request content from the content generating server 112 without first receiving requests for content from the client devices 120A-Z, 120ZA-ZZ. The content providing servers 118A-118Z can also provide the corresponding characteristics associated with the client devices 120A-Z, 120ZA-ZZ (which may include characteristics of users of such client devices) along with the requests to the content generating server 112.

Subsequently, the content providing servers 118A-118Z may receive the requests for content from the content generating server 112. The content providing servers 118A-118Z may generate content items based on the requests and provide the content items to the client devices 120A-120Z, 120ZA-120ZZ. Different content items may be provided to different client devices 120A-Z, 120ZA-ZZ based at least in part on the characteristics associated with those different client devices 120A-Z, 120ZA-ZZ and or respective users of the client devices 120A-Z, 120ZA-ZZ. Responsive to receiving the content items, client devices 120A-120Z, 120ZA-120ZZ may or may not receive user interaction with the content items, which may be associated with KPIs. Furthermore, the content providing servers 118A-118Z may receive any responses to the presented content items from the client devices 120A-120Z, 120ZA-120ZZ. The content providing servers 118A-118Z may subsequently provide the responses to the content generating server 112.

The client devices 120A-120Z may include one or more processing devices communicatively coupled to memory devices and I/O devices. The client devices 120A-120Z may be desktop computers, laptop computers, tablet computers, mobile phones (e.g., smartphones), or any suitable computing device. As discussed above, the client devices 120A-120Z may each include a web browser and/or a client application (e.g., a mobile application or a desktop application) for viewing contents (including content items) provided by the content providing servers 118A-118Z via user interfaces 124A-124Z, 124ZA-124ZZ supported by a web browser and/or a client application.

Figure 2:
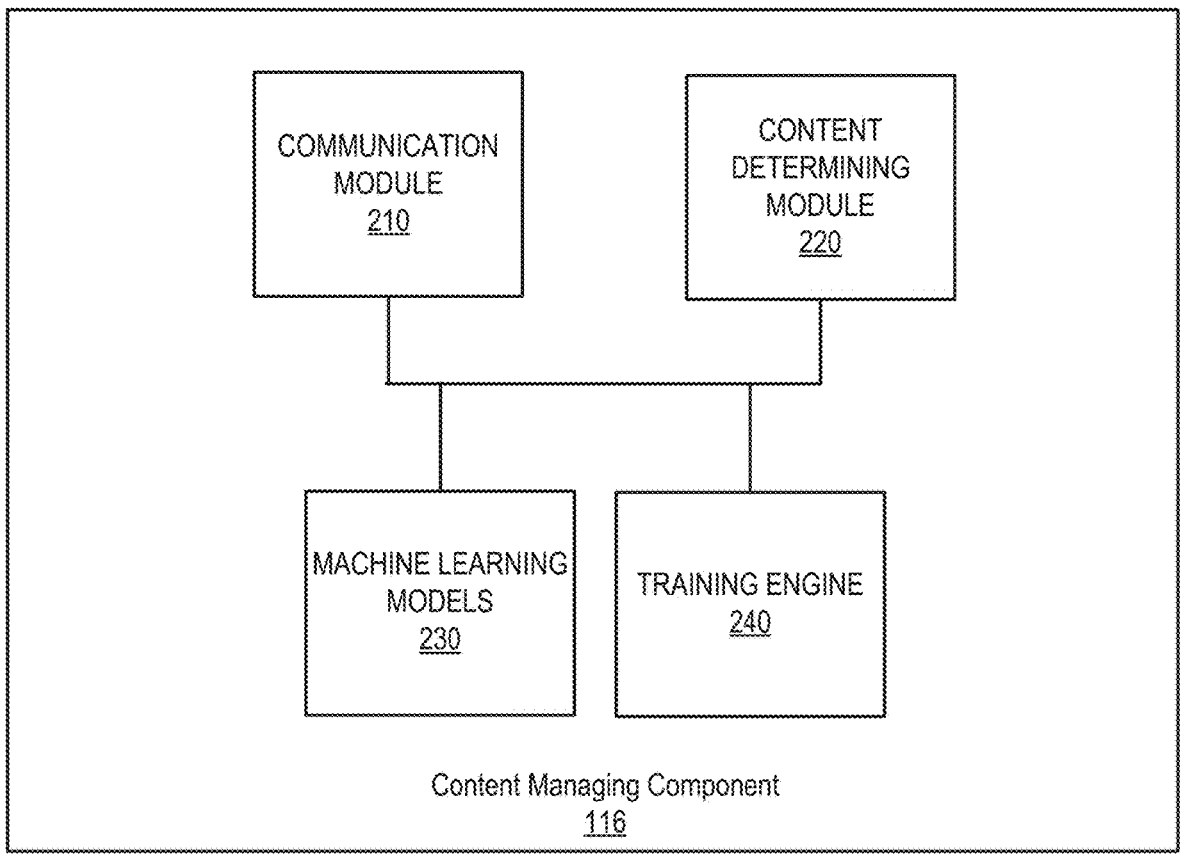
FIG. 2 depicts an example of a content managing component, in accordance with some embodiments of the disclosure.

FIG. 2 depicts an example of a content managing component 116, in accordance with some embodiments of the disclosure. The content managing component 116 can include a communication module 210, a content determining module 220, machine learning models 230, and a training engine 240. The components can be combined together or separated into further components, according to particular implementations. It should be noted that in some implementations, various components of the content managing component 116 may run on separate machines.

The communication module 210 can communicate with the content providing servers 118A-118Z to receive requests for a content item, corresponding sets of characteristics to the requests, and any responses (e.g., a click on the content item, a viewing of the content item, a conversion, after having seen or clicked the content item, purchasing an item presented in the content item or any other type of conversion) to the content item. The communication module 210 can also provide the requested content item to the content providing servers 118A-118Z.

The training engine 240 can train the machine learning models 230. In one embodiment, the training engine can periodically train the machine learning models 230 in multiple phases, thereby increasing model accuracy as more training data accumulates. The training engine 240 can train the machine learning models 230 to solve a probability or score estimation problem—that is, whether a content item associated with a respective machine learning model 230 is most likely to achieve a response action from a target (the achievement can be measured by a key performance indicator (KPI)). This task class deals with ranking tasks, therefore both probability and score can be applied for different models, the only requirement is the presence of a common scale for comparison. The training engine 240 may find patterns in training data (including training input and training output) that map the training input to the target output (i.e., the answer to be predicted) and provide the machine learning model 230 that captures these patterns under supervised learning. Accordingly, the trained machine learning models 230 can each predict a probability of a target audience having a respective set of input characteristics performing a target action (such as, a click) in response to being presented with a respective content item.

Some of the machine learning models 230 may be associated with a different content templates, and may process an input set of characteristics to determine a probability of a key performance indicator being achieved if a content item based on the associated content template is presented to a target. The outputs of multiple machine learning models 230 may be ranked, and an optimal (based on current information) content template may be determined. The optimal content template may be for the content item specific to a target with the input set of characteristics.

Other machine learning models 230 may be associated with a different content item component of a content template, and may process an input set of characteristics to determine a probability of a key performance indicator being achieved if the content item including the associated content item component is presented to a target. The outputs of multiple machine learning models 230 may be compared, and an optimal (based on current information) set of content item components may be determined. The Optimal set of content item components together may form a content item in accordance with an associated content template, specific to a target with the input set of characteristics. More details about training the machine learning models 230 and using the trained machine learning models 230 are described below with respect to FIGS. 4, 5A, and 5B.

Figure 4:
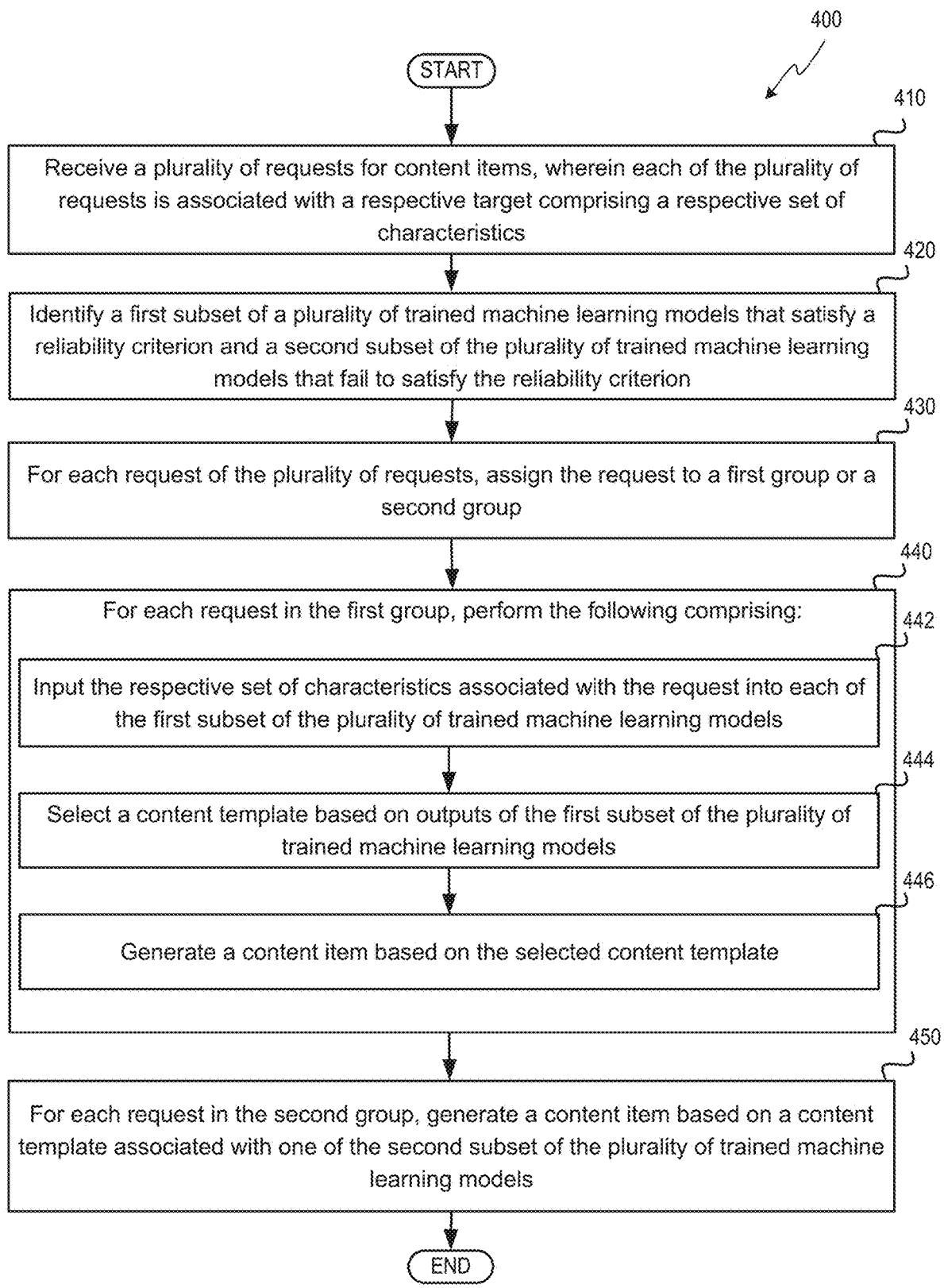
FIG. 4 depicts a flow diagram of a method for generating a content item, in accordance with some embodiments of the present disclosure.
Figure 5A:
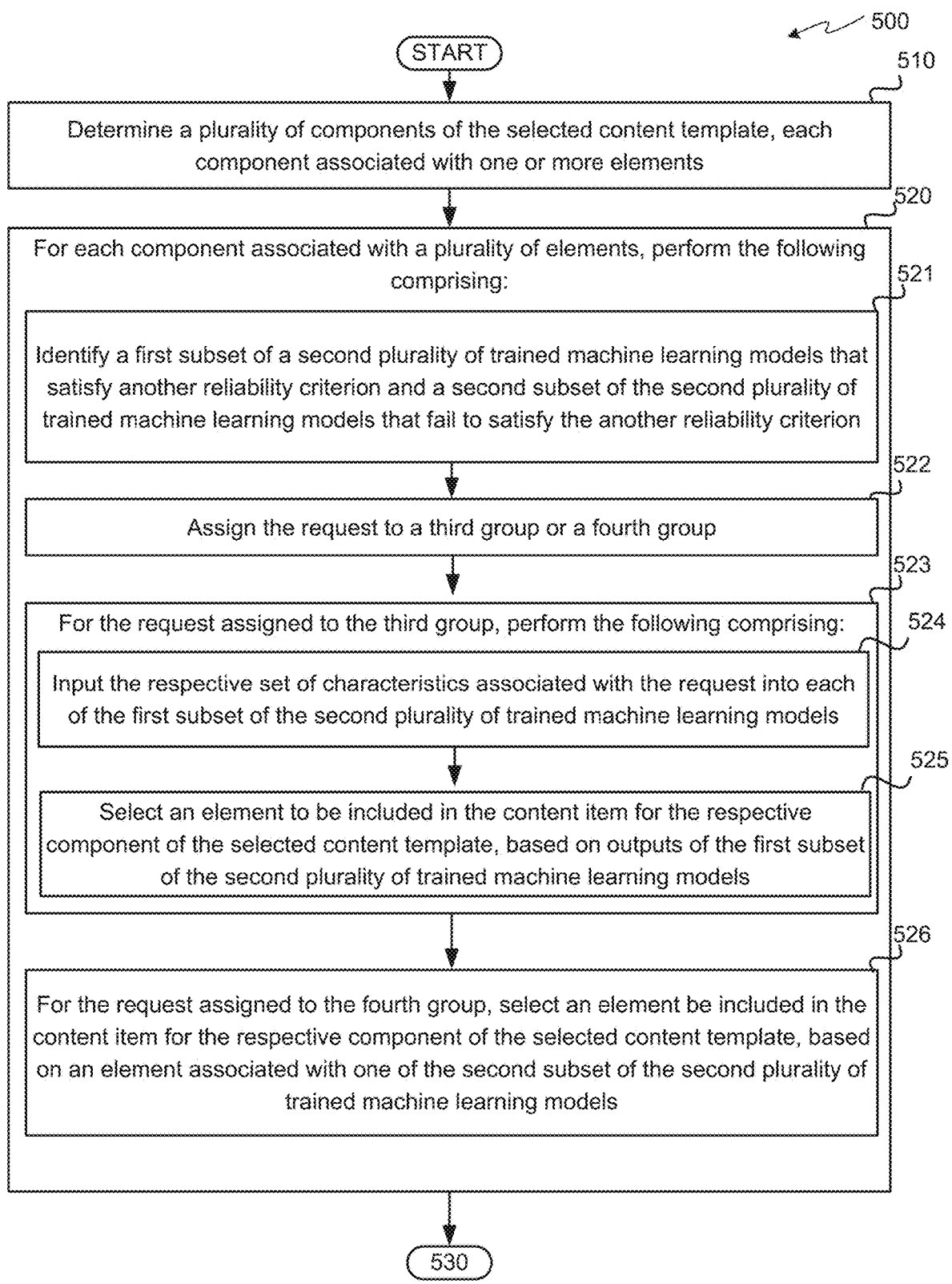
FIG. 5A depicts a flow diagram of a method for generating a content item based on a selected content template, in accordance with some embodiments of the present disclosure.
Figure 5B:
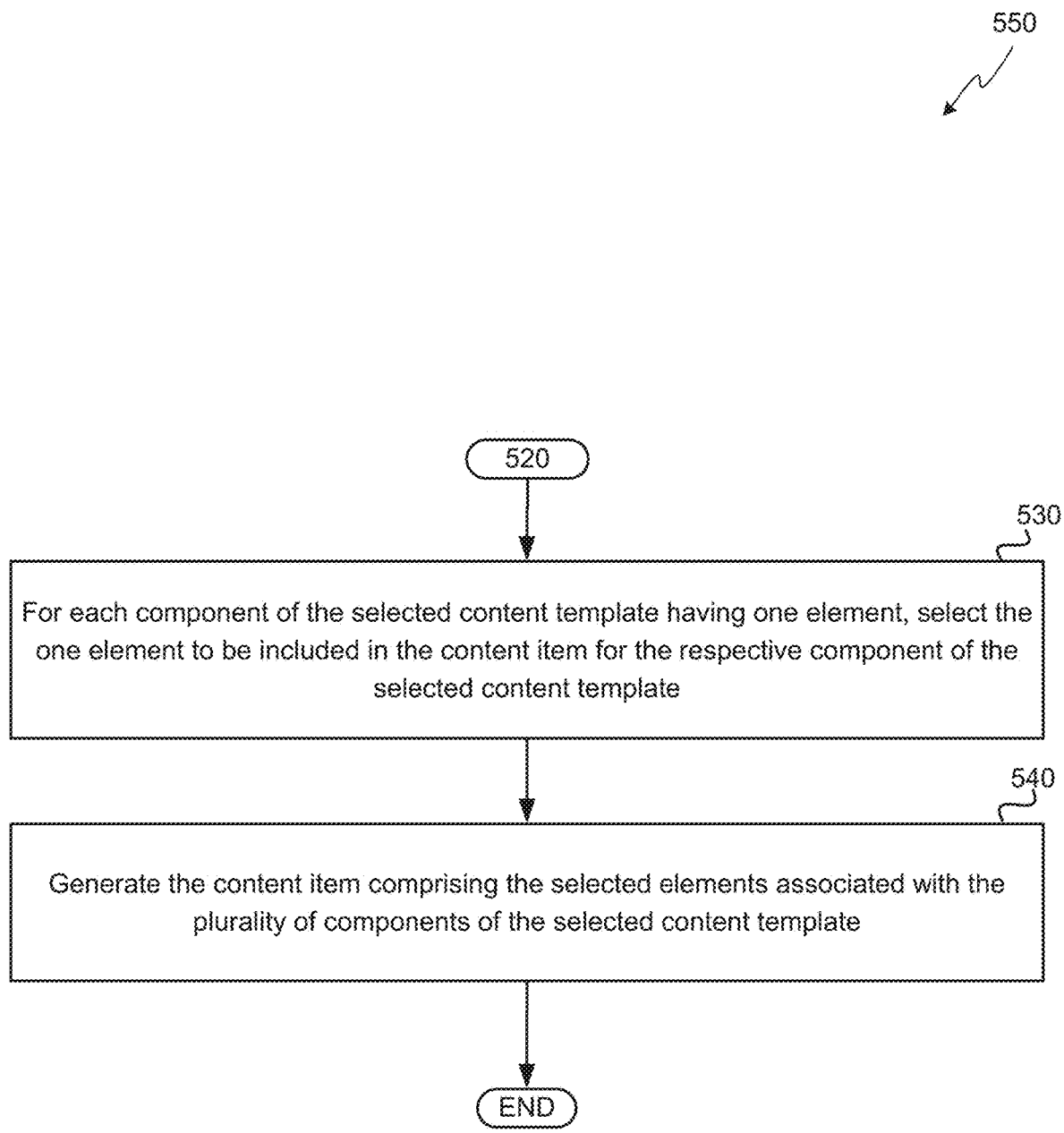
FIG. 5B depicts a flow diagram of a method that is continued from the method of FIG. 5A for generating a content item based on a selected content template, in accordance with some embodiments of the present disclosure.

The content determining module 220 can generate a content item by using the trained machine learning models 230 and a set of characteristics received from the communication module 210, as will be further described with respect to FIGS. 4, 5A, and 5B.

Figure 3A:
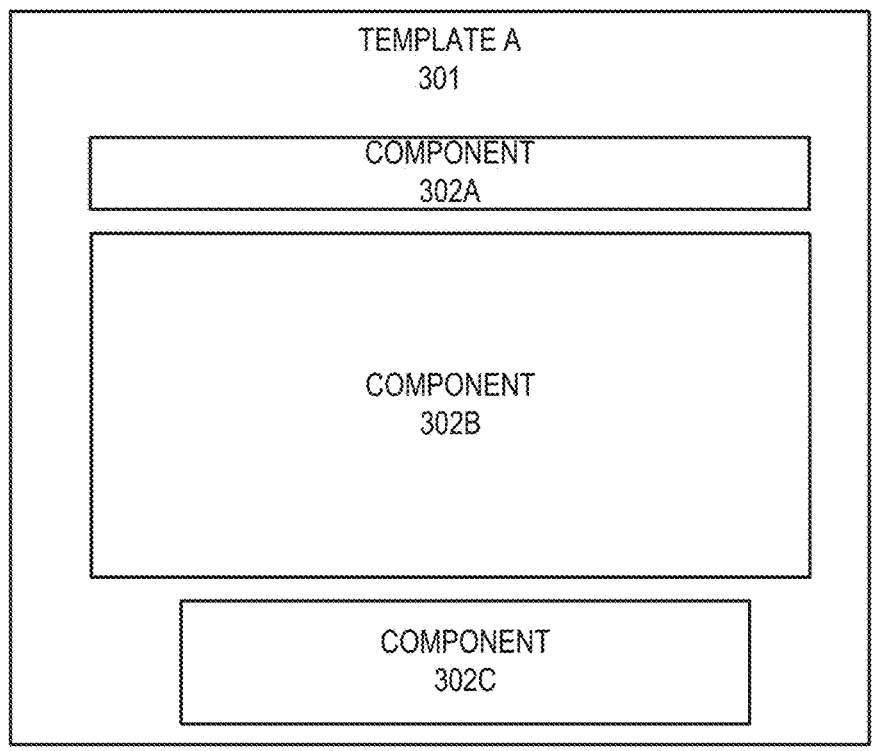
FIG. 3A illustrates an example template of a content item in accordance with some embodiments of the present disclosure.

FIG. 3A illustrates an example template 301 of a content item in accordance with some embodiments of the present disclosure. The template 301 can include multiple components 302A to 302C. For example, components 302A to 302C can be skins, backgrounds, titles, texts, call-to-actions, etc. Each component 302A to 302C may be associated one or more elements. That is, each component 302A to 302C can have different options such as different colors of the background component. If, for example, there are 100 options for the component 302A, 100 options for component 302B and 100 options for component 302C, then there are 100×100×100=1,000,000 different content items that can be created for this simple template 301. More complex templates may have an increased number of components, which may further increase the total number of combinations, and thus the number of different unique content items that can be generated from the template.

Figure 3B:
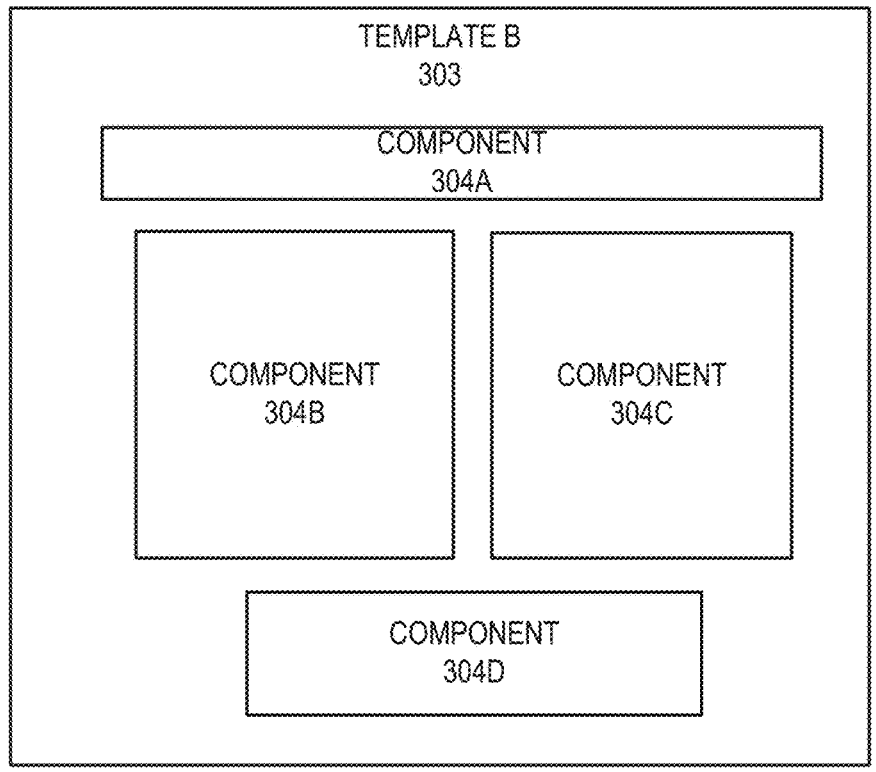
FIG. 3B illustrates another example template of a content item in accordance with some embodiments of the present disclosure.

FIG. 3B illustrates another example template 303 of a content item in accordance with some embodiments of the present disclosure. Although the template 303 may be a template for the same content item as that of the template 301, the template 303 can include a different number of components, as well as different types of components. In the illustrated example, template 303 includes components 304A to 304D.

Figure 3C:
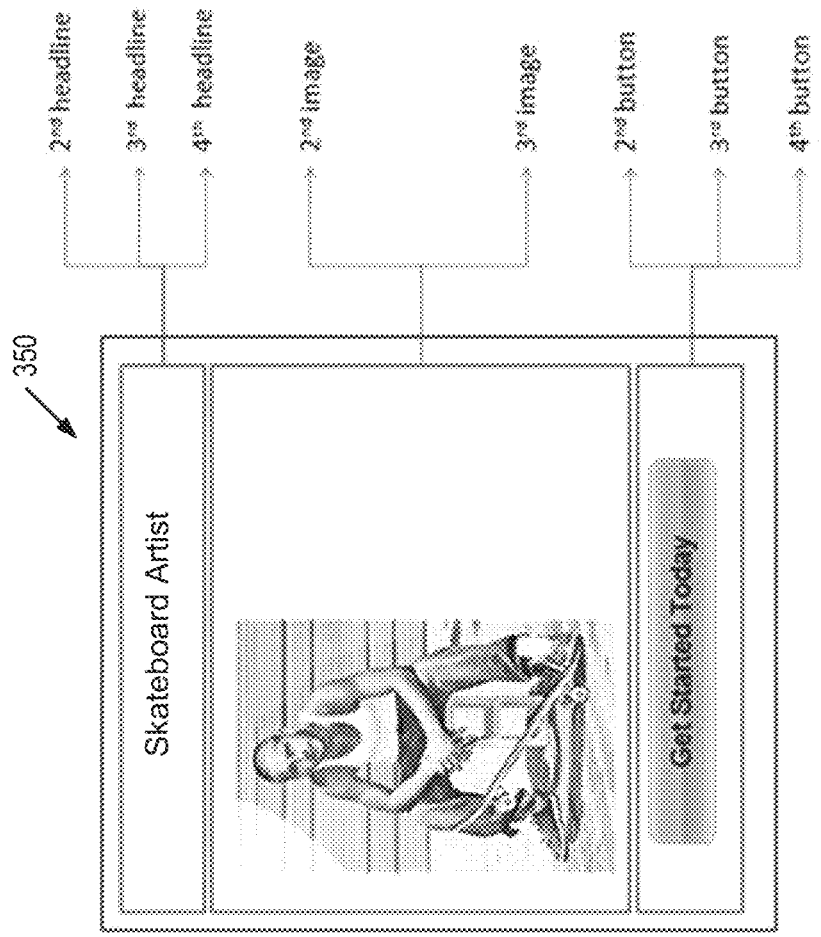
FIG. 3C illustrates an example content item generated from a template of FIG. 3A in accordance with some embodiments of the present disclosure.

FIG. 3C illustrates an example content item 350 generated from template 301 of FIG. 3A in accordance with some embodiments of the present disclosure. As illustrated, the content item 350 includes three components: a headline component, an image component, and a call to action component in accordance with the template 301 of FIG. 3A. Based on the methods described below with respect to FIGS. 4, 5A, and 5B, the first headline element out of four elements is selected to present the text, "Skateboard Artist" for the headline component. As for the image component, a first image out of three image elements is selected to display a man with a skateboard. Lastly, for a call to action component, the first button from four elements is selected to implement the interactive button, "Get Started Today."

The present disclosure describes adaptive optimization of a content item using continuously trained machine learning models. That is, the systems and methods described herein adaptively optimizes content items by training machine learning models in multiple phases.

At an initial phase of generating content items where machine learning models are not yet trained because there is no (or not enough) data on KPIs or responses to any of the templates or elements, a content item can be randomly or pseudo-randomly generated. For example, such a content item can include a random or pseudo-random number and types of content components and corresponding elements may be generated. Once enough initial data (responses from target audiences of content items) is gathered, machine learning models for each template and for each element of each component in a template can be generated and trained.

In one embodiment, machine learning models can be trained based on a limited number of training data, such as a couple of thousands sets of training data or the training data collected over a couple of days based on responses to the randomly or pseudo-randomly generated content items. The processing device can include a training engine that is capable of training a machine learning model. The training engine may find patterns in training data (including training input (sometime, referred to as features) and training output (sometimes, referred to as a target label or target output)) that map the training input to the training output (i.e., the answer to be predicted) and provide the machine learning model that captures these patterns under supervised learning. Such a machine learning model can correspond to a model artifact that is created by the training engine that uses training data (e.g., training inputs and corresponding training outputs (i.e., correct answers for respective training inputs)). The machine learning model may be composed of, e.g., a single level of linear or non-linear operations based on logistic regression or gradient boosting technique.

As an example, a machine learning model can be trained based on training inputs including multiple sets of characteristics describing a target (e.g., a target audience of the content item), and corresponding training outputs indicating whether or not target actions (e.g., a click on the content item, a viewing of the content item, a conversion, after having seen or clicked the content item, purchasing an item presented in the content item or any other type of conversion) are performed by the targets responsive to being presented with content items based on the associated content template. As a result of the training, the trained machine learning model can provide a probability that a target having a set of characteristics would perform a target action in response to being presented with a content item generated based on the respective content template associated with the respective trained machine learning model.

After the initial training, a processing device of the present disclosure can group the machine learning models into the first subset or the second subset based on a reliability criterion, as well as any correlation to KPIs. For example, the processing device can group the trained machine learning models associated with content templates into two subsets. The first subset can include machine learning models that satisfy the reliability criterion (i.e., that are determined to be sufficiently reliable, stable, or accurate). On the other hand, the second subset can include machine learning models that does not yet satisfy the reliability criterion (i.e., that are determined to be not sufficiently reliable, stable, or accurate yet—that is, more training data is needed). The processing device can similarly group the trained machine learning models associated with elements of content components in a content template.

In one implementation, the processing device can utilize a reliability criterion that is associated with at least one of a mean or a standard deviation of an area under the ROC (receiver operating characteristic) curve that is generated using one or more sets of validation data with a respective trained machine learning model. The validation data can include validation input data as a set of characteristics associated with a target and validation output data as an indication of whether or not a target action was performed. For example, the processing device can use a multi-fold cross-validation technique. Accordingly, for each fold (e.g., each set of validation data), the processing device can determine an area under ROC curve (AUC). Based on the AUC, the processing device can determine a mean and standard deviation of the AUC. Subsequently, the processing device can determine that a trained machine learning model satisfies a reliability criterion in response to determining that a) a difference between the mean and standard deviation of the AUC is greater than a threshold value (e.g., 0.5) and b) the standard deviation of the AUC is equal to or less than a threshold value (e.g., 0.1). Accordingly, any trained machine learning models that satisfies the reliability criterion is categorized as the first subset and the trained machine learning models that does not satisfy the reliability criterion is categorized as the second subset. The next phase of generating content items using continuously trained machine learning models are described below with respect to FIGS. 4, 5A, and 5B.

FIG. 4 depicts a flow diagram of a method 400 for generating a content item, in accordance with some embodiments of the present disclosure. The method 400 may be performed by the content managing component 116 of FIG. 1. The method 400 may be executed by one or more processing devices of the server 112. The method 400 may be carried out for each content providing server 118A-118Z to be presented to client devices 120A-120Z, 120ZA-120ZZ.

For simplicity of explanation, the method 400 of this disclosure is depicted and described as a series of acts. However, acts in accordance with this disclosure can occur in various orders and/or concurrently, and with other acts not presented and described herein. Furthermore, not all illustrated acts may be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification are capable of being stored on an article of manufacture (e.g., a computer program accessible from any computer-readable device or storage media) to facilitate transporting and transferring such method to computing devices.

At operation 410, the processing device receives requests for content items. The processing device can receive such requests from content providing servers (the content providing server 118A-118Z). The content items can later be included, by the content providing servers, in a web page to be loaded by a web browser of the client devices (the client devices 120A-120Z, 120ZA-120ZZ). Examples of a content item can include a personalized advertisement, media (a video or music) or consumer electronics recommendation, a landing page, a check out page, a packaging or a cover design, etc.

Each request received at operation 410 can be associated with a respective target (e.g., a target audience of the content item) including a set of characteristics. That is, the target can be represented by a set of characteristics such as demographic characteristics (such as age or gender), contextual characteristics (such as device brand, operating system, user time, geographic location), historical (or user behavioral) characteristics (such as a number of impressions, time since the last impression, number of clicks). In one embodiment, each request can include data representing such a set of characteristics.

At operation 420, the processing device identifies a first subset of trained machine learning models that satisfy a reliability criterion and a second subset of the plurality of trained machine learning models that fail to satisfy the reliability criterion. Refer to the above for more details about the reliability criterion. In one implementation, each trained machine learning model is associated with a content template (out of multiple content templates available for the requested content item). That is, each trained machine learning model can provide predictions of how likely it is for a target (e.g., a target audience of the content item) to respond to a content item generated using the associated content template. In particular, each trained machine learning model corresponds to a machine learning model associated with a content template that is trained using training data comprising training inputs and training outputs.

At operation 430, the processing device, for each request, assigns the request to a first group or a second group. In one implementation, the processing device can assign each request to either group based on a ratio of a number of trained machine learning models (associated with a content template) that satisfy the reliability criterion to a number of trained machine learning models (associated with a content template) that do not satisfy the reliability criterion. For example, once the processing device determines the ratio, the processing device can determine a number of requests to assign to the first group and a number of requests to assign to the second group based on the ratio. In case the ratio is 3:2, the processing device can assign 60% of the requests to the first group and the rest (the 40% of the requests) to the second group. Accordingly, the processing device can assign a request to the first group or the second until the determined quota for each group is reached.

In some embodiments, the processing device can assign a small portion, such as 5%, of the requests to another group and provide a randomly generated content item to the respective targets. The processing device can receive responses of the targets when such content items are presented to the targets. The processing device can subsequently use the responses to further (adaptively) train all machine learning models associated with content templates and elements of the content templates.

At operation 440, the processing device, for each request in the first group (the group of requests to be processed using sufficiently stable trained machine learning models), performs the following operations 442 to 446. At operation 442, the processing device inputs the respective set of characteristics associated with the request in the first group into each trained machine learning model in the first subset of the trained machine learning models. In one implementation, the processing device can determine from the request the set of characteristics such as demographic characteristics (such as age or gender), contextual characteristics (such as device brand, operating system, user time, geographic location), historical (or user behavioral) characteristics (such as a number of impressions, time since the last impression, number of clicks).

At operation 444, the processing device selects a content template based on outputs of the first subset of the trained machine learning models. In one implementation, in response to inputting the set of characteristics to each machine learning model of the first subset, the processing device can obtain outputs from the machine learning models in the first subset. Such an output can indicate a probability of the target having the set of characteristics performing a target action in response to being presented with a content item generated in accordance with a content template associated with the respective trained machine learning model. In addition, the output can be a numerical value between 0 and 1—the higher the number, the higher the probability is. Based on the outputs of the first subset of the trained machine learning models, the processing device can determine an output indicating a highest probability of the respective target performing the target action. Accordingly, the processing device can identify a content template associated with the trained machine learning model that generated such an output. The processing device can select the content template for the requested content item.

At operation 446, the processing device generates a content item based on the selected content template. Details about how the content item is generated based on the selected content template is described below with respect to FIGS. 5A-5B.

At operation 450, the processing device, for each request in the second group, generates a content item based on a content template associated with one of the second subset of the trained machine learning models. In one implementation, the processing device can determine a content template associated with each one of the second subset of the trained machine learning models. The processing device can determine any one of the content templates. In one implementation, the processing device can randomly select one of the content templates. Subsequently, the processing device can generate the requested content item in accordance with the determined content template.

For example, the templates 301 and 303 from FIGS. 3A and 3B can be associated with the second subset of the trained machine learning models. The processing device can determine to use the template 301 in FIG. 3A to generate a content item, for example, an advertisement. As illustrated, the template 301 has three components 302A to 302C—a title, an image, a call to action. Each component 302A-302C can be associated with one or more elements that can be presented as the respective component. For each component 302A-302C, the processing device can select any one element from the associated elements. As illustrated in FIG. 3C, the processing device can, for example, generate the content item 350 using the first element for each component 302A-302C.

After the processing device generates the content item, the processing device can provide the content item to a content providing server that transmitted a request for the content item. Subsequently, the content providing server can present the content item to a client device. The content providing server may or may not receive a response from the client device within a pre-determined time period. In one embodiment, the processing device can receive, for each content item generated for each request in the second group, a respective indication as to whether the associated respective target performed a target action responsive to presentation of the respective content item to the respective target. The indication can contain binary information (e.g., yes or no, or 1 or 0) as to whether the target action was performed or not. When receiving the indication, the processing device can also receive metadata identifying the request or the content item associated with the indication.

The processing device can train the second subset of the plurality of trained machine learning models using the characteristics, the content items generated based on the characteristics, and the received indications associated with the content items. In one implementation, each trained machine learning model of the second subset of the trained machine learning models is trained for a respective content template using a) respective sets of characteristics of targets associated with requests for which the respective content template was selected, b) respective content items generated for the respective requests and c) respective indications associated with the respective content items. For example, for each indication, the processing device can determine the content item associated with the indication and the set of characteristics used in generating the content item. The processing device can determine a trained machine learning model from the second subset that is associated with the determined content item. Once the processing device identifies the trained machine learning model associated with the content item of the indication, the processing device can use the set of characteristics associated with the indication as a training input and the indication as a label or target to further train the machine learning model.

After the secondary training of the machine learning models in the second subset, the processing device can determine, for each trained machine learning model in the second subset, whether the trained machine learning model satisfies the reliability criterion. Accordingly, the processing device can move those trained machine learning models from the second subset that satisfy the reliability criterion to the first subset. As such, while the stable or reliable models (i.e., machine learning models in the first subset) reflecting strong signals or patterns despite of being initially trained on limited data sets, are utilized to generate an optimized content item, the weak or less reliable models can be further and adaptively trained based on more training data and data sets reflecting any changes in the pattern since the initial training. In this way, the present disclosure provides adaptive optimization of content item using continuous machine learning models.

In another embodiment, the processing device can receive indications of target action for every content item generated (e.g., including content items generated based on outputs of trained machine learning models in the first subset). Then, the processing device can use the indications for further training all the initially trained machine learning models (e.g., the machine learning models that are in the first and the second subset) that are associated with content templates. Accordingly, the machine learning models can be adjusted to further improve an accuracy of the machine learning models and/or to accommodate any changes in user behavior since the initial training. Therefore, the machine learning models can be continuously trained to generate adaptively optimized content items.

FIG. 5A depicts a flow diagram of a method 500 for generating a content item based on a selected content template, in accordance with some embodiments of the present disclosure. The method 500 may be performed by the content managing component 116 of FIG. 1. The method 500 may be executed by one or more processing devices of the server 112. The method 500 may be carried out for each content providing server 118A-118Z to be presented to client devices 120A-120Z, 120ZA-120ZZ.

For simplicity of explanation, the method 500 of this disclosure is depicted and described as a series of acts. However, acts in accordance with this disclosure can occur in various orders and/or concurrently, and with other acts not presented and described herein. Furthermore, not all illustrated acts may be required to implement the method 500 in accordance with the disclosed subject matter. In addition, those skilled in the art will understand and appreciate that the method 500 could alternatively be represented as a series of interrelated states via a state diagram or events. Additionally, it should be appreciated that the method 500 disclosed in this specification are capable of being stored on an article of manufacture (e.g., a computer program accessible from any computer-readable device or storage media) to facilitate transporting and transferring such method to computing devices.

At operation 510, the processing device determines components of a selected content template (e.g., the content template selected at operation 444). As illustrated in FIGS. 3A to 3C, a content template may include a plurality of components (e.g., a title, a call to action, an image, a video, an audio, a background image, a message, etc.). Each component can be associated with one or more elements. As shown in FIG. 3C, the image component can have three different images (i.e., elements), but only one image is to be included in a particular content item for the image component of the content template 301 of FIG. 3A. Hereinafter, the content template 301 of FIG. 3A will be used as an example of the selected content template, for the purpose of illustration.

At operation 520, the processing device, for each component of the selected content template associated with multiple elements, performs operations 521 to 525. At operation 521, the processing device identifies a first subset of the trained machine learning models (associated with elements of the respective component) that satisfy a reliability criterion and a second subset of the trained machine learning models (associated with elements of the respective component) that fail to satisfy the reliability criterion. In one implementation, each trained machine learning model is associated with a respective element of the respective component of the selected content template. For example, referring back to the content item 350 of FIG. 3C, for the headline component, there are four headline elements (i.e., four different headline messages). Thus, the set of trained machine learning models can correspond to the trained machine learning models for the four headline elements. Each trained machine learning model can be associated with each headline element.

Furthermore, each trained machine learning model is trained to output a probability that a target associated with an input set of characteristics would perform a target action responsive to being presented with a content item including the respective element associated with the respective trained machine learning model. Accordingly, each trained machine learning model can predict a likelihood or a probability of a target (e.g., a target audience of the content item) responding to a content item including the respective element (e.g., the first headline in the content item 350 of FIG. 3C). Each trained machine learning model can be trained using training data comprising training inputs and training outputs.

At operation 522, the processing device assigns the request to a third group or a fourth group. The processing device can perform operation 522 for each component of the selected content template. For example, for the headline component of FIG. 3C, the processing device can determine the request should be assigned to one of the two groups (a group of requests to be processed using sufficiently reliable trained machine learning models associated with elements of the headline component and the other group of request to be processed by randomly or pseudo-randomly selecting one of elements (for the headline component) associated with less reliable trained machine learning models). For the image component of FIG. 3C, the processing device can determine that the request should be assigned to one of the two groups (a group of requests to be processed using sufficiently reliable trained machine learning models associated with elements of the image component and the other group of request to be processed by randomly or pseudo-randomly selecting one of elements (for the image component) associated with less reliable trained machine learning models). The two groups for the headline component should be different from the two groups for the image component.

Moreover, this request corresponds to one of the requests assigned to the first group (to be processed using sufficiently reliable machine learning models associated with content templates) at operation 440. Accordingly, in addition to being assigned to the first group, the request can also be assigned to a third group or a fourth group. Similar to how requests were assigned to the first group or second group at operation 430, the processing device can assign this request to the third group or the fourth group based on a ratio of a number of trained machine learning models (associated with elements) that satisfy a reliability criterion to a number of trained machine learning models (associated with elements) that does not satisfy the reliability criterion.

For example, the processing device can determine the ratio to be 3:1. By using the headline component of the content item 350 in FIG. 3C, the processing device can determine that a trained machine learning model for the fourth headline does not satisfy the reliability criterion. In such a case, the processing device can assign 75% of the requests to the third group and the rest (the 25% of the requests) to the fourth group. As another example, for the image component of the content item 350 in FIG. 3C, the processing device can determine that the ratio of a number of trained machine learning models that satisfies a reliability criterion to a number of trained machine learning models that do not satisfy the reliability criterion for the image elements as 1:2. In addition, or in the alternative, the processing device can identify that only the trained machine learning model for the second image element satisfies the reliability criterion. Accordingly, the processing device can assign 33% of the requests to the third group and the rest to the fourth group.

At operation 523, the processing device, for the request assigned to the third group, performs operations 524 to 525. At operation 524, the processing device inputs the respective set of characteristics associated with the request into each (that satisfy the reliability criterion) of the first subset of the second plurality of trained machine learning models associated with elements for the respective component of the selected content template. The set of characteristics can include demographic characteristics (such as age or gender), contextual characteristics (such as device brand, operating system, user time, geographic location), historical (or user behavioral) characteristics (such as a number of impressions, time since the last impression, number of clicks) of the respective target (e.g., a target audience of the request).

At operation 525, the processing device selects an element to be included in the content item for the respective component of the selected content template, based on outputs of the first subset of the trained machine learning models associated with elements. In one implementation, the processing device can select an element associated with a trained machine learning model that provided the highest probability—the probability of the target having the set of characteristics performing a target action in response to being presented with a content item including the element associated with the respective trained machine learning model in accordance with the selected content template.

At operation 526, for the request assigned to the fourth group, the processing device selects an element to be included in the content item for the respective component of the selected content template, based on an element associated with one of the second subset of the trained machine learning models associated with elements. Similar to operation 450, the processing device can determine elements associated with trained machine learning models included in the second subset (the weak or less stable machine learning models). The processing device can select any one of the elements to be included in the content item in accordance with the selected content template. After the operation 526, the processing device continues to operation 530 in FIG. 5B.

FIG. 5B depicts a flow diagram of a method 550 that is continued from the method of FIG. 5A for generating a content item based on a selected content template, in accordance with some embodiments of the present disclosure. The method 550 may be performed by the content managing component 116 of FIG. 1. The method 550 may be executed by one or more processing devices of the server 112. The method 550 may be carried out for each content providing server 118A-118Z to be presented to client devices 120A-120Z, 120ZA-120ZZ.

At operation 530, the processing device, for each component of the selected content template having one element, selects the one element to be included in the content item for the respective component of the selected content template.

At operation 540, the processing device generates the content item that includes the elements selected at operations 525, 526, and/or 530 in association with the components of the selected content template.

In some embodiments, the processing device can further train the machine learning models in the second subset of the trained machine learning models associated with elements in a similar way as the secondary training of the machine learning models associated with content templates as described above with respect to FIG. 4. That is, for each generated content item associated with each request in the fourth group (the group of requests to be provided with an element randomly selected from elements associated with the trained machine learning models that fails to satisfy the reliability criterion), the processing device can receive an indication as to whether the associated respective target performed a target action responsive to presentation of the respective content item including the selected element to the respective target. This information, along with information on the set of characteristics of the target to which the content item was provided, may be used to further refine the appropriate trained machine learning model associated with the content item.

Subsequently, the processing device can train the second subset of the trained machine learning models associated with elements using a) the respective set of characteristics of target associated with the request for which the respective element was selected, b) the respective content item including the associated respective element and c) the respective indication associated with the respective content item. After the secondary training, the processing device can determine whether any trained machine learning models can be moved from the second subset to the first subset of trained machine learning models associated with elements based on the reliability criterion. In case the processing device determines one or more trained machine learning models that are now sufficiently stable, reliable, or accurate, the processing device can move the trained machine learning models to the first subset.

Figure 6:
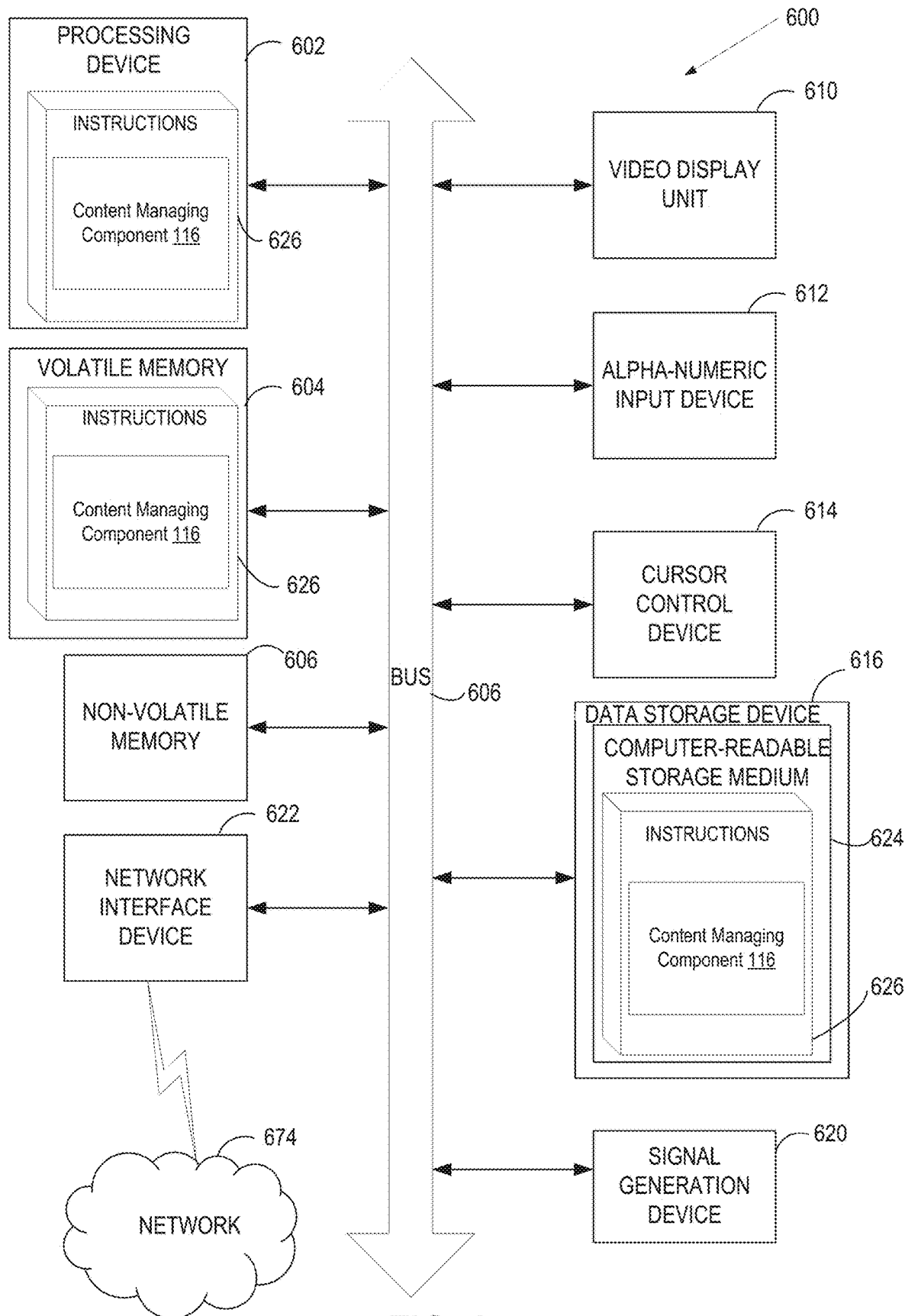
FIG. 6 depicts a block diagram of an example computing system operating in accordance with one or more aspects of the present disclosure.

FIG. 6 depicts a block diagram of an example computing system 600 operating in accordance with one or more aspects of the present disclosure. In various illustrative examples, computer system 600 may correspond to any of the computing devices within system architecture 100 of FIG. 1. In one implementation, the computer system 600 may be the content generating server 112.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions implementing the content managing component 116 of FIG. 1 for implementing the methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "identifying", "determining", "generating", "assigning", "inputting", "selecting", "training", "moving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving a plurality of requests for content items, wherein each of the plurality of requests is associated with a respective target comprising a respective set of characteristics;
   identifying a first subset of a plurality of trained machine learning models that satisfy a reliability criterion and a second subset of the plurality of trained machine learning models that fail to satisfy the reliability criterion, wherein each trained machine learning model of the plurality of trained machine learning models is associated with a respective content template of a plurality of content templates and is trained to output a probability that a target associated with an input set of characteristics would perform a target action responsive to being presented with a content item generated based on the respective content template associated with the respective trained machine learning model;
   for each request of the plurality of requests, assigning the request to a first group or a second group based on a ratio of a number of trained machine learning models that satisfy the reliability criterion to a number of trained machine learning models that fail to satisfy the reliability criterion;
   for each request in the first group, performing the following comprising:
      inputting the respective set of characteristics associated with the request into each of the first subset of the plurality of trained machine learning models;

selecting a content template based on outputs of the first subset of the plurality of trained machine learning models; and generating a content item based on the selected content template; and for each request in the second group, generating a content item based on a content template associated with one of the second subset of the plurality of trained machine learning models.

2. The method of claim 1, further comprising:

receiving, for each generated content item for each request in the second group, a respective indication as to whether the associated respective target performed a target action responsive to presentation of the respective content item to the respective target;

training the second subset of the plurality of trained machine learning models, wherein each trained machine learning model of the second subset of the plurality of trained machine learning models is trained for a respective content template of the plurality of content templates using a) respective sets of characteristics of targets associated with requests for which the respective content template was selected, b) respective content items generated for the respective requests and c) respective indications associated with the respective content items;

determining, for each trained machine learning model in the second subset, whether the trained machine learning model satisfies the reliability criterion; and moving those trained machine learning models that satisfy the reliability criterion from the second subset of the plurality of trained machine learning models to the first subset of the plurality of trained machine learning models.

3. The method of claim 1, the selecting the content template comprising:

determining, based on the outputs of the first subset of the plurality of machine learning models, the content template associated with an output indicating a highest probability of the respective target performing the target action.

4. The method of claim 1, wherein the generating the content item based on the selected content template comprising:

determining a plurality of components of the selected content template, each component associated with one or more elements;

for each component of the selected content template having a plurality of elements, performing the following comprising:

identifying a first subset of a second plurality of trained machine learning models that satisfy another reliability criterion and a second subset of the second plurality of trained machine learning models that fail to satisfy the another reliability criterion, wherein each trained machine learning model of the second plurality of trained machine learning models is associated with a respective element of a respective component of the selected content template and is trained to output a probability that a target associated with an input set of characteristics would perform a target action responsive to being presented with a content item including the respective element associated with the respective trained machine learning model of the second plurality of trained machine learning models;

assigning the request to a third group or a fourth group;

for each request in the third group, performing the following comprising:

inputting the respective set of characteristics associated with the request into each of the first subset of the second plurality of trained machine learning models; and selecting an element to be included in the content item for the respective component of the selected content template, based on outputs of the first subset of the second plurality of trained machine learning models; and for each request in the fourth group, selecting an element to be included in the content item for the respective component of the selected content template, based on an element associated with one of the second subset of the second plurality of trained machine learning models;

for each component of the selected content template having one element, selecting the one element to be included in the content item for the respective component of the selected content template; and generating a content item comprising the selected elements associated with the plurality of components of the selected content template.

5. The method of claim 4, further comprising:

receiving, for each generated content item for each request in the fourth group, a respective indication as to whether the associated respective target performed a target action responsive to presentation of the respective content item to the respective target;

training the second subset of the second plurality of trained machine learning models, wherein each trained machine learning model of the second subset of the second plurality of trained machine learning models is trained for a respective element of a component of the selected content template using a) respective sets of characteristics of targets associated with requests for which the respective element was selected, b) respective content items including the associated respective element and c) respective indications associated with the respective content items;

determining, for each trained machine learning model in the second subset of the second plurality of trained machine learning models, whether the trained machine learning model satisfies the reliability criterion; and moving those trained machine learning models that satisfy the another reliability criterion from the second subset of the second plurality of trained machine learning models to the first subset of the second plurality of trained machine learning models.

6. The method of claim 5, wherein the another reliability criterion is associated with at least one of a mean or a standard deviation of an area under receiver operating characteristic (ROC) curve determined for a respective trained machine learning model of the second plurality of trained machine learning models using one or more sets of validation data, the validation data comprising validation input data and validation output data, wherein the validation input data includes another set of characteristics associated with another target and the validation output data includes an indication of whether or not another target action was performed.

7. The method of claim 4, wherein the assigning the request to the third group or the fourth group comprises:

determining a ratio of a number of trained machine learning models in the first subset of the second plurality of trained machine learning models to a number of trained machine learning models the second subset of the second plurality of trained machine learning models;

determining a number of requests to assign to the third group and another number of requests to assign to the fourth group based on the ratio; and assigning the request to the third group or the fourth group based on the number of requests to assign to the third group and the another number of requests to assign to the fourth group.

8. The method of claim 4, wherein a trained machine learning model of the second plurality of trained machine learning model corresponds to a machine learning model associated with an element associated with a component of content template that is trained using training data comprising training inputs and training outputs, the training inputs including a plurality set of characteristics associated with targets and the training outputs including a plurality of indications as to whether corresponding target actions were performed by the targets responsive to being presented with content items comprising the respective element.

9. The method of claim 1, wherein the reliability criterion is associated with at least one of a mean or a standard deviation of an area under receiver operating characteristic (ROC) curve determined for a respective trained machine learning model of the plurality of trained machine learning models using one or more sets of validation data, the validation data comprising validation input data and validation output data, wherein the validation input data includes another set of characteristics associated with another target and the validation output data includes an indication of whether or not another target action was performed.

10. The method of claim 1, wherein the assigning the request to the first group or the second group comprises:

determining the ratio of a number of trained machine learning models in the first subset of the plurality of trained machine learning models to a number of trained machine learning models the second subset of the plurality of trained machine learning models;

determining a number of requests to assign to the first group and another number of requests to assign to the second group based on the ratio; and assigning the request to the first group or the second group based on the number of requests to assign to the first group and the another number of requests to assign to the second group.

11. The method of claim 1, wherein the generating the content item based on the content template associated with one of the second subset of the plurality of trained machine learning models comprising:

determining one of one or more content templates associated with the second subset of the plurality of trained machine learning models; and generating the content item in accordance with the determined content template.

12. The method of claim 1, wherein a trained machine learning model of the plurality of trained machine learning model corresponds to a machine learning model that is associated with a content template and that is trained using training data comprising training inputs and training outputs, the training inputs including a plurality set of characteristics associated with targets and the training outputs including a plurality of indications as to whether corresponding target actions were performed by the targets responsive to being presented with content items based on the content template.

13. A system comprising:

a memory; and a processing device, operatively coupled with the memory, the processing device configured to perform operations comprising:

receiving a plurality of requests for content items, wherein each of the plurality of requests is associated with a respective target comprising a respective set of characteristics;

identifying a first subset of a plurality of trained machine learning models that satisfy a reliability criterion and a second subset of the plurality of trained machine learning models that fail to satisfy the reliability criterion, wherein each trained machine learning model of the plurality of trained machine learning models is associated with a respective content template of a plurality of content templates and is trained to output a probability that a target associated with an input set of characteristics would perform a target action responsive to being presented with a content item generated based on the respective content template associated with the respective trained machine learning model;

for each request of the plurality of requests, assigning the request to a first group or a second group based on a ratio of a number of trained machine learning models that satisfy the reliability criterion to a number of trained machine learning models that fail to satisfy the reliability criterion;

for each request in the first group, performing the following comprising:

inputting the respective set of characteristics associated with the request into each of the first subset of the plurality of trained machine learning models;

selecting a content template based on outputs of the first subset of the plurality of trained machine learning models; and generating a content item based on the selected content template; and for each request in the second group, generating a content item based on a content template associated with one of the second subset of the plurality of trained machine learning models.

14. The system of claim 13, wherein the operations further comprising:

receiving, for each generated content item for each request in the second group, a respective indication as to whether the associated respective target performed a target action responsive to presentation of the respective content item to the respective target;

training the second subset of the plurality of trained machine learning models, wherein each trained machine learning model of the second subset of the plurality of trained machine learning models is trained for a respective content template of the plurality of content templates using a) respective sets of characteristics of targets associated with requests for which the respective content template was selected, b) respective content items generated for the respective requests and c) respective indications associated with the respective content items;

determining, for each trained machine learning model in the second subset, whether the trained machine learning model satisfies the reliability criterion; and moving those trained machine learning models that satisfy the reliability criterion from the second subset of the plurality of trained machine learning models to the first subset of the plurality of trained machine learning models.

15. The system of claim 13, the selecting of the content template comprising:
determining, based on the outputs of the first subset of the plurality of machine learning models, the content template associated with an output indicating a highest probability of the respective target performing the target action.

16. The system of claim 13, wherein the generating the content item based on the selected content template comprising:
determining a plurality of components of the selected content template, each component associated with one or more elements;
for each component of the selected content template having a plurality of elements, performing the following comprising:
identifying a first subset of a second plurality of trained machine learning models that satisfy another reliability criterion and a second subset of the second plurality of trained machine learning models that fail to satisfy the another reliability criterion, wherein each trained machine learning model of the second plurality of trained machine learning models is associated with a respective element of a respective component of the selected content template and is trained to output a probability that a target associated with an input set of characteristics would perform a target action responsive to being presented with a content item including the respective element associated with the respective trained machine learning model of the second plurality of trained machine learning models;
assigning the request to a third group or a fourth group;
for each request in the third group, performing the following comprising:
inputting the respective set of characteristics associated with the request into each of the first subset of the second plurality of trained machine learning models; and
selecting an element to be included in the content item for the respective component of the selected content template, based on outputs of the first subset of the second plurality of trained machine learning models; and
for each request in the fourth group, selecting an element to be included in the content item for the respective component of the selected content template, based on an element associated with one of the second subset of the second plurality of trained machine learning models;
for each component of the selected content template having one element, selecting the one element to be included in the content item for the respective component of the selected content template; and
generating a content item comprising the selected elements associated with the plurality of components of the selected content template.

17. A non-transitory computer readable storage medium comprising instructions that, when executed by a processor, cause the processor to perform operations comprising:
receiving a plurality of requests for content items, wherein each of the plurality of requests is associated with a respective target comprising a respective set of characteristics;
identifying a first subset of a plurality of trained machine learning models that satisfy a reliability criterion and a second subset of the plurality of trained machine learning models that fail to satisfy the reliability criterion, wherein each trained machine learning model of the plurality of trained machine learning models is associated with a respective content template of a plurality of content templates and is trained to output a probability that a target associated with an input set of characteristics would perform a target action responsive to being presented with a content item generated based on the respective content template associated with the respective trained machine learning model;
for each request of the plurality of requests, assigning the request to a first group or a second group based on a ratio of a number of trained machine learning models that satisfy the reliability criterion to a number of trained machine learning models that fail to satisfy the reliability criterion;
for each request in the first group, performing the following comprising:
inputting the respective set of characteristics associated with the request into each of the first subset of the plurality of trained machine learning models;
selecting a content template based on outputs of the first subset of the plurality of trained machine learning models; and
generating a content item based on the selected content template; and
for each request in the second group, generating a content item based on a content template associated with one of the second subset of the plurality of trained machine learning models.

18. The non-transitory computer readable storage medium of claim 17, wherein the operations further comprising:
receiving, for each generated content item for each request in the second group, a respective indication as to whether the associated respective target performed a target action responsive to presentation of the respective content item to the respective target;
training the second subset of the plurality of trained machine learning models, wherein each trained machine learning model of the second subset of the plurality of trained machine learning models is trained for a respective content template of the plurality of content templates using a) respective sets of characteristics of targets associated with requests for which the respective content template was selected, b) respective content items generated for the respective requests and c) respective indications associated with the respective content items;
determining, for each trained machine learning model in the second subset, whether the trained machine learning model satisfies the reliability criterion; and
moving those trained machine learning models that satisfy the reliability criterion from the second subset of the plurality of trained machine learning models to the first subset of the plurality of trained machine learning models.

19. The non-transitory computer readable storage medium of claim 17, the selecting the content template comprising:
determining, based on the outputs of the first subset of the plurality of machine learning models, the content template associated with an output indicating a highest probability of the respective target performing the target action.

20. The non-transitory computer readable storage medium of claim 17, wherein the generating the content item based on the selected content template comprising:
- determining a plurality of components of the selected content template, each component associated with one or more elements;
- for each component of the selected content template having a plurality of elements, performing the following comprising:
  - identifying a first subset of a second plurality of trained machine learning models that satisfy another reliability criterion and a second subset of the second plurality of trained machine learning models that fail to satisfy the another reliability criterion, wherein each trained machine learning model of the second plurality of trained machine learning models is associated with a respective element of a respective component of the selected content template and is trained to output a probability that a target associated with an input set of characteristics would perform a target action responsive to being presented with a content item including the respective element associated with the respective trained machine learning model of the second plurality of trained machine learning models;
  - assigning the request to a third group or a fourth group;
  - for each request in the third group, performing the following comprising:
    - inputting the respective set of characteristics associated with the request into each of the first subset of the second plurality of trained machine learning models; and
    - selecting an element to be included in the content item for the respective component of the selected content template, based on outputs of the first subset of the second plurality of trained machine learning models; and
  - for each request in the fourth group, selecting an element to be included in the content item for the respective component of the selected content template, based on an element associated with one of the second subset of the second plurality of trained machine learning models;
- for each component of the selected content template having one element, selecting the one element to be included in the content item for the respective component of the selected content template; and
- generating a content item comprising the selected elements associated with the plurality of components of the selected content template.

* * * * *